United States Patent
Eckstein et al.

(10) Patent No.: US 8,376,232 B2
(45) Date of Patent: Feb. 19, 2013

(54) MEDICAL PRODUCT

(75) Inventors: Axel Eckstein, Heidenheim (DE); Jürgen Hofstetter, Heidenheim (DE)

(73) Assignee: Paul Hartmann Aktiengesellschaft, Heidenheim (DE)

( * ) Notice: Subject to any disclaimer, the term of this patent is extended or adjusted under 35 U.S.C. 154(b) by 0 days.

(21) Appl. No.: 13/082,689

(22) Filed: Apr. 8, 2011

(65) Prior Publication Data
US 2011/0183712 A1     Jul. 28, 2011

Related U.S. Application Data

(63) Continuation of application No. PCT/EP2009/006200, filed on Aug. 27, 2009.

(30) Foreign Application Priority Data

Oct. 8, 2008  (EP) ..................................... 08017606

(51) Int. Cl.
*G06K 7/10* (2006.01)
(52) U.S. Cl. .............. 235/462.09; 235/462.13
(58) Field of Classification Search ............. 235/462.13, 235/383, 380, 375, 385, 462.09
See application file for complete search history.

(56) References Cited

U.S. PATENT DOCUMENTS

| | | | |
|---|---|---|---|
| 7,702,162 B2 * | 4/2010 | Cheong et al. | 382/232 |
| 2003/0031586 A1 | 2/2003 | Eckhardt et al. | |
| 2003/0109816 A1 | 6/2003 | Lachenbruch et al. | |
| 2005/0038558 A1 * | 2/2005 | Keene | 700/235 |

FOREIGN PATENT DOCUMENTS

| | | |
|---|---|---|
| EP | 0 828 523 | 3/1998 |
| EP | 1 292 258 | 3/2003 |
| WO | 03/098543 | 11/2003 |

\* cited by examiner

*Primary Examiner* — Karl D Frech
(74) *Attorney, Agent, or Firm* — Brinks Hofer Gilson & Lione

(57) ABSTRACT

The invention relates to a medical product having a carrier layer, wherein one of the two sides of the carrier layer forming the surface forms an outer side of the medical product, wherein a code is permanently applied to the side forming the outer side wherein the code is a two-dimensional matrix code indicating a uniform source indicator of an internet site comprising application-specific and/or technical data about the medical product. The invention further relates to a set comprising at least one medical product, particularly present in a package, and a decoding device for decoding the identification code and for producing the connection to the internet site, and to the use of the code.

14 Claims, 2 Drawing Sheets

(A)

(B1) (B2)

MEDICAL PRODUCT

CROSS-REFERENCE TO RELATED APPLICATIONS

Figure 1:
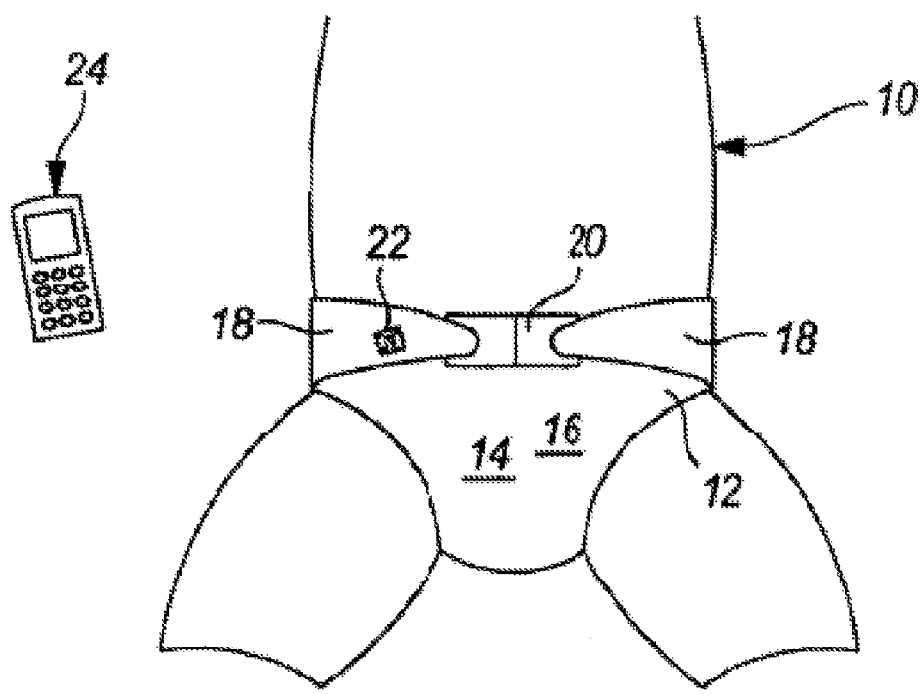

This application is a continuation of International Application No. PCT/EP2009/006200 filed on Aug. 27, 2009, which claims the benefit of EP 08 017 606.8, filed Oct. 8, 2008. The disclosures of the above applications are incorporated herein by reference.

FIELD

The invention relates to a medical product with a carrier layer, with one of the two sides forming the surface of the carrier layer as the exterior side of the medical product, with encoding or a code permanently attached to the side forming the outside.

BACKGROUND

The statements in this section merely provide background information related to the present disclosure and may not constitute prior art.

In this context, medical product shall comprise, among other things, diapers, incontinence pads, and disposable sheets, but also wound dressings, compresses, and band-aids, as well as dressings and bandages, in particular compression and fixation bandages. In addition, medical product shall also comprise draping for patients or devices during a surgery, as well as clothing articles for the surgeon, such as surgical gowns, gloves, and scrub caps. Finally, medical products shall also include pharmaceutical products. All these products have in common that when needed, they are removed from packaging which may contain technical or usage-related information in the form of a package insert, or is provided as a short version on the packaging itself, in order then to be worn in particular on the body, or to be taken into the body, as is the case, for example, with a diaper, or a wound dressing, or a band-aid, or a surgical gown, or to be used in an operating room without additional solid contact with the insert or the packaging. The same essentially applies to pharmaceutical products, frequently removed from the outer packaging, in particular to tablets, removed from packaging in so-called blister packs for carrying or storing without further contact with the packaging and the insert. Frequently, for better storage, the insert initial is removed from the outer packaging, and then no longer is available for further consultations.

This presents a problem inasmuch as technical information or user-related information related to the usage of the product cannot be attached to these types of medical products due to dimensional or spatial reasons, or due to other reasons.

Nevertheless, it may be relevant or necessary later, in particular during or after the use, to obtain information, in particular concerning the instructions for use, or the side effects.

In addition, in many regards, for example, as relevant to the distribution companies, the pharmaceutical products approval authorities, or the consumers, it may be desirable or necessary to provide a clear identification of the medical products. Thus, definitive identification of the product will be possible even if packaging inserts or other accompanying information is not available. This cannot always be guaranteed by shape, size, or appearance of the product alone.

Therefore, it is already common technological practice to provide product information in the form of product codes, for example, a series of numbers or such on the products, for example diapers, with respective information found in EP 1 292 258 B1. However, in that case the consumer is unable to obtain information directly from the encoding. In addition, only simple information can be included in this type of encoding. In particular, it is subsequently not possible to provide the information included in the insert or even to provide additional information.

Coding of a medical product is already established in EP 0 828 523 B1, which describes how to apply a permanent identifying encoding to a transdermal therapeutic system in such manner that the encoding on the back layer consists of a locally differing surface quality, surface thickness, or surface roughness of this back layer.

In addition, a method for providing counterfeit-proof marking of products is known from WO 03/098543 A1, which provides for individual marking and non-coded marking, with the encoded marking corresponding to the non-coded marking when decoded with the public key. Marking is creating with a secret segment of the key, so that with conformance of the two markings after the decoding of the encoded part, it is guaranteed that the encoded part was created with the secret part of the key, and that the manufacturer of the original created the encoded part, thus confirming the product as an original.

SUMMARY

The problem of this invention is to provide a medical product where the consumer may obtain further information relating to the medical product in a simple manner, even when additional information, such as the package insert, is no longer is available. At the same time, it shall be ensured that the information provided definitively relates to the respective product.

The invention solves this problem with a medical product with a carrierlayer, with one of the two surface-forming sides of the carrierlayer forming an outside of the medical product, with encoding, and/or a code permanently attached to the side forming the outside. The encoding (code) consists of a two-dimensional matrix code, providing a uniform source indicator (URL=Uniform Resource Locator) of an internet site providing usage-specific, and/or technical data relating to the medical product. Generally, a plurality of codes is known today, labeled barcodes, with such barcodes representing optical electronically readable writing, consisting of various lines, or elements and spaces. The terms "Code" and "Encoding" are used synonymously. These codes can be read with optical reading devices, such as for example barcode reading devices (scanners), or CCD cameras, but also mobile phones and PDAs, and processed. They can be applied with conventional printing processes such as offset printing, flexoprinting, or gravure printing, but also with laser printing, thermodirect, thermotransfer, or inkjet printing. One differentiates between barcodes with the code applied to one axis only, one-dimensional codes, and the use of two-dimensional codes, with the code applied to two axes. These codes can consist of stacked one-dimensional codes, arranged in lines, or true aerial codes. In addition, so-called 3D-codes exist, with the tone of color, color saturation, or brightness representing the third dimension, for example. All two-dimensional codes encode the information perpendicular to the primary direction.

True aerial codes or matrix codes, also called array codes, are differentiated from the stacked codes. In matrix codes, data is encoded evenly within a matrix of blocks. In true matrix codes, the direction is irrelevant, so that reading is possible omnidirectionally. This is advantageous especially with medical products such as wound dressings or band-aids, as it simplifies reading by the user, and no directional data must be applied to the product allowing reading. This omnidirectional readability is advantageous in all products not containing any given product-internal orientation.

In this case, it is highly preferable that the two-dimensional matrix code is a QR-code. QR codes can be very small, and possess nearly unlimited durability. Data provided in the QR code is redundant. Depending on design, data can still be decoded even if up to 30% of the code is destroyed.

Advantageous in the use of QR codes is the fact that many of today's mobile phones or PDAs (Personal Digital Assistants) with a built-in camera come with software allowing the reading of QR codes. The software is available for many other devices. Pursuant to the invention, the code encodes an internet or web address. Since today most mobile phones or PDAs include a web browser in addition to a camera, the code can be read, for example, with a mobile phone, with the software automatically leading to the respective encoded internet site. Relevant information for the specific product can be obtained immediately from this internet site, while avoiding searching the homepage of the manufacturer, or even generally searching the internet for initially obtaining the manufacturer data.

In addition, further information can be included in the encoding. This additional information is included in a second two-dimensional matrix code. For example, the first two-dimensional matrix code can provide the uniform resource locator (URL) of the internet site providing usage-specific, and/or technical data relating to the medical product. The second two-dimensional matrix code can provide a phone number establishing a direct connection to an advice site for the medical product. In turn, these phone numbers can immediately be processed in the mobile phone or in the PDA, thus also enabling contact with a hotline or similar, for example, for obtaining further information, for example concerning side effects of the product, in the event a connection with the internet site encoded in the code, cannot be established, or the reading of the data on the display of a mobile phone, for example, is considered inconvenient, and a direct consultation with an adviser is desired. Pursuant to a further thought of the present invention, a medical product including at least two two-dimensional matrix codes, in particular two QR codes thus also is the subject matter of the present invention, with the first matrix code providing a uniform resource locator of an internet site providing usage-specific, and/or technical data, and the second matrix code providing a phone number, establishing a direct connection to a consultation site for the medical product.

In lieu of a QR code, data-matrix codes, maxi-codes, Aztec codes, or dot-codes/point codes may be used for encoding.

Here, the QR code offers the advantage that decoding software is widely available these days, and even free of charge, so that access to the relevant data is possible for nearly every user.

The Quick Response code, or QR code, which is square and has three search helps, easily recognizable as light and dark squares stacked within each other in three of the corners, includes symbolic elements, formed as squares. Pursuant to the invention, 21×21 up to 75×75 squares, in particular 21×21 up to including 53×53 squares and in particular 21×21 squares up to including 45×45 squares can be provided.

The code, in particular, can cover an area of a minimum of 0.5 cm$^2$, and a maximum of 20 cm$^2$. Thus, the code can be applied to nearly all relevant medical products without destroying their usability and appearance, while being equally well findable and recognizable by the consumer and user. In particular, the code can be 1 cm$^2$ and 15 cm$^2$, and especially preferred between 1 cm$^2$, and 9 cm$^2$ in size.

It is possible that one of the error correction levels will be applied, allowing a reconstruction of the damaged code from 7% up to 30%. This means that up to 7%, or even up to 30% of the code no longer is legible, but information can still be obtained from the code.

In particular it is possible that the usage-specific, and/or technical information is a reproduction of the content of the package insert or the usage guidelines according to medical product guidelines of the medical product. In this manner, it can be ensured that all data contained in the information is available later, even after separation of the medical product itself from the package insert and/or added note, or from the usage directions for the consumer, even after completed application of the product. For example, in the case of a band-aid worn on the skin of a patient for a certain period of time, with the patient detecting skin reactions, for example, after removal of the band-aid, information relating to the band-aid can be provided with the help of the code, which indicates possible side effects, but also other information, for example, whether the band-aid is the type especially for sensitive skin.

It is particularly preferred that the internet site provide the information or data in the language of the country where the product was sold. This information can be added to the code as additional information, so that the consumer will be directed immediately to the internet site in the respective language.

It is also possible for the carrier layer to consist of woven fabric, interlaced fabric, knit fabric, nonwoven fabric, a film, or a combination thereof. The code can be applied directly to the carrier layer, in particular printed directly onto the carrier layer, with all known printing procedures being used. As alternative, the code can be applied indirectly to the carrier layer, for example, via an additional layer partially attached to the carrier layer. This additional layer can be a label, adhesive label or similar for example, attached permanently to the carrier layer. As an alternative, a coating can be applied to the carrier layer, where the code then will be imprinted. In addition to the carrier layer, additional layers can be provided, in particular absorbent layers, as well as layers facing the carrier of the medical product. The number of layers is unlimited.

Particularly preferred is that the code is covered with a transparent layer, in particular a non-reflective transparent coating. In that manner, the code can be protected during the use of the medical product, safeguarded from rubbing off, for example, or the entry of liquid. After the application of the code, the coating can be applied to that area at a minimum.

It is particularly preferred that the medical product is a sterile medical product. It is possible that the code includes a color indicator that will change color during a sterilization process. It is particularly preferred that the color will possess an absorption maximum in the wavelength range between 400 and 800 nm following sterilization. The color conversion can be handled in such manner the conversion only takes place in the event of a correctly performed sterilization, with the code simultaneously used as color indicator for correctly sterilized products. In that manner, the code can provide additional and immediately visible information to the user in addition to the encoded information. It is particularly preferred if the code shows an absorption maximum within the visible range following sterilization, since this allows a particularly simple recognizability. For example, it is possible that the code becomes visible to a person only by the sterilization. It is an advantage that no additional technical devices are required for recognition, and that the memorization effort for the user can be reduced, in contrast to a color conversion in the visible range. For example, if the color of the code changes within the visible range from red to green, the user needs to remember the significance of red, that is, not sterilized, and green, that is, sterilized. This might appear comparatively simple with such distinct colors, also common in other areas of life. This becomes more difficult with a color conversion from blue to green. If the color changes to the effect that the code first becomes visible, the recognition that sterilization was successfully performed is further simplified.

In addition, the invention comprises a set of at least one medical product pursuant to the above-described type, and a decoder device for decoding the code, and for establishing a connection to the internet, and thus for referring to the internet site.

The medical product in particular can be provided in the form of packaging.

A mobile phone or PDA can be used as preferred decoding device, equipped with a device for taking pictures, in particular a camera, and a decoder and transmission software for the code. This means that the mobile phone or the PDA, if a PDA is used as decoding device, require software for reading these codes, preferably QR codes, as well as software for establishing a connection to the internet, in particular a web browser.

In addition, the invention comprises an application of a true matrix code (array code), in particular a quick response code (QR code) for encoding of a uniform resource locator (Engl.: Uniform Resource Locator (URL)), an internet site providing user-specific information, and/or technical data about a medical product, on the exterior of a medical product. The user-specific information, in particular the content duplication of the package insert, the added note or the usage directions, can be provided according to the medical product guidelines of this medical product.

Such codes can be applied in particular to medical products pursuant to guideline 93/42 EEC by the Council dated 14 Jun. 1993, or its updated version. Such codes can be applied in particular to diapers, incontinence pads, but also disposable sheets, wound dressings, compresses, band-aids, bandages and elastic bandages, compression bandages, fixation bandages, draping for patients or devices in an operating room, as well as clothing during the surgery, such as gowns, caps, or gloves. Independently, such codes can also be applied to pharmaceutical products.

Further areas of applicability will become apparent from the description provided herein. It should be understood that the description and specific examples are intended for purposes of illustration only and are not intended to limit the scope of the present disclosure.

DRAWINGS

Figure 2:
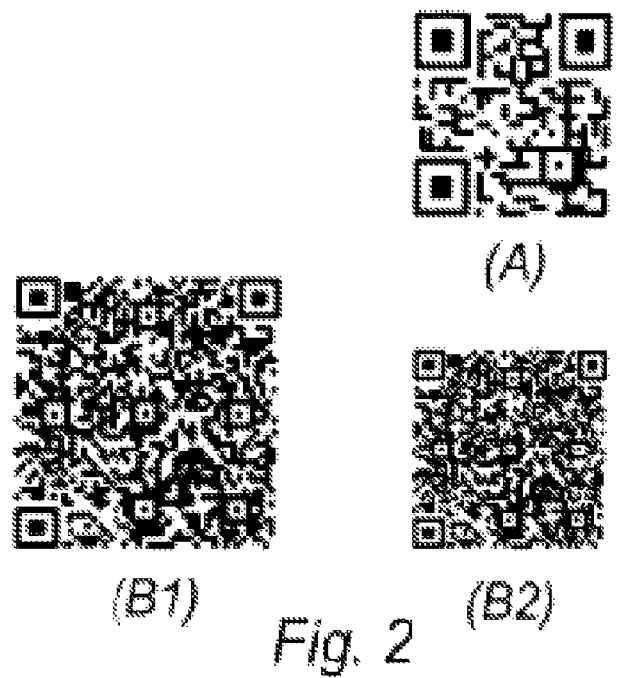
Figure 3A:
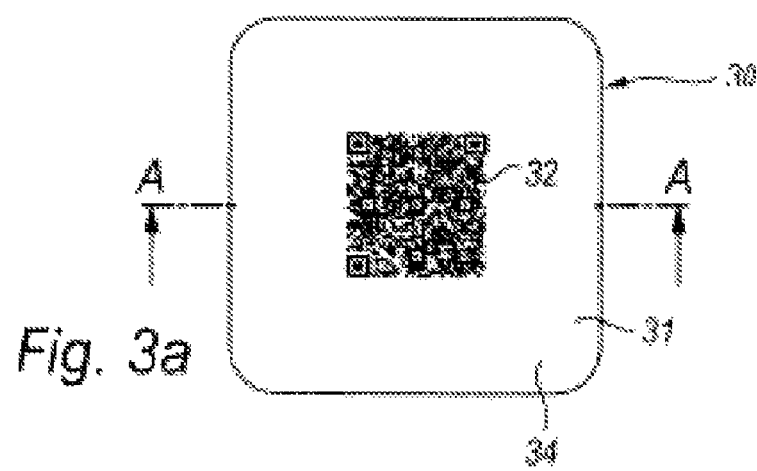
Figure 3B:
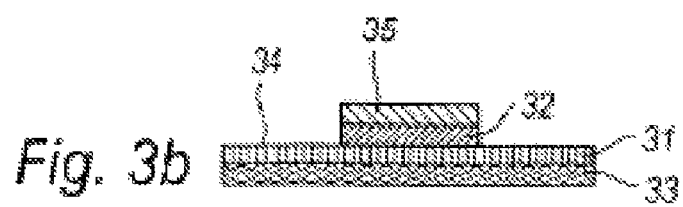

In order that the disclosure may be well understood, there will now be described various forms thereof, given by way of example, reference being made to the accompanying drawings, in which:

FIG. 1: In diagram 1 a diaper applied to one wearer;
FIG. 2: two QR codes; and
FIGS. 3a and 3b: a wound dressing.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Diagram 1 shows a diaper 12 applied to a wearer and/or a person 10, comprising a carrier layer 14, with a surface forming side of the carrier layer, identified by reference number 16, as exterior of the medical product, that is the diaper 12. The medical product 12 comprises additional layers, in particular, an internal layer facing wearer 10, not depicted, as well as additional layers between the internal layer and the carrier layer 14, in particular a vacuum body, also not depicted. The diaper is attached to the wearer 10 with two closure elements 18, attached to the posterior waist area of the diaper 12, and where one additional fastening element 20 can be attached in the anterior waist area. Concerning the structure, this essentially is a common diaper.

In the area of the fastening elements 18, a code 22 is imprinted onto the carrier layer 14, visible from the outside 16, and wherein the code 22 pertains to a so-called QR code.

In particular if the customer (wearer or third person) wishes to receive additional information relating to the medical product after removing the diaper 12 from the packaging, code 22 can be scanned with the PDA or the mobile telephone, for example, with such devices as mobile phones and PDAs requiring a camera and software allowing the decoding of such QR codes, with the mobile phone marked with reference number 24 in diagram 1.

If the user or another person wishes to receive information concerning diaper 12, for example on the fabric of one of the layers, but also concerning the question of what size or for what type of use such diapers 12 may be used, etc., code 22 can be scanned with the help of mobile phone 24 and decoded; the software provided on mobile phone 24 will connect directly to the respective internet site of the manufacturer in the language of the country where the product was purchased.

Diagram 2 shows a depiction (A) of a first Quick-Response code, 3×3 cm, that is 9 cm² large, containing the information http://www.hartmann.info which is the encoded reference to the homepage of the manufacturer of the product. The code shows as symbolic elements 25×25 squares of equal size, with both white and black squares being counted.

It is particularly preferred, however, that the user is connected directly to the respective page relating to the product. Diagram (B1) shows a respective alternative QR code, containing the information http://produktkatalog.hartmann.info/PHb2c/catalog/Z_set.doZ_areaID=3EC01F992482E056E10000000A808F21 directly to the respective product page. The user scanning the code then can immediately obtain technical information or user-specific information relating to the medical product 12 from this product page. The code shows as symbolic elements 45×45 squares of equal size, with both white and black squares being counted.

Diagram (B2) shows the same code depicted in diagram (B1) in smaller form (3×3 cm).

In that manner, it can be achieved that even after a product was separated from the packaging insert and additional information, and in particular from the packaging, in particular while the product already is in use, the respective information is available at any time, even when the user and the person requesting information do not know the manufacturer of the product.

In this manner, safety and convenience of medical products can be further enhanced.

Diagram 3a (overview) and 3b (cross-section A-A) shows a wound dressing (30), showing a QR code (32) permanently attached to the outside (34) of a carrier layer (31). The QR code is imprinted directly onto the carrier layer in a thermotransfer printing procedure. The QR code provides the encoded uniform resource locator (URL) of the internet address, http://fr.hartmann.info/FR/Accueil/Produits/Soins blank des blank plaies/article 64088.html, the user-specific information and technical data concerning the product in the language of the country where the product was sold. The code shows as symbolic elements 41×41 squares of equal size. The wound dressing consists of a carrier layer of steam permeable polyurethane film, completely covered with an adhesive material (33) made of a polyacrylate-polymer. For protection and better adhesion, the QR code is covered with a transparent layer (35) of polyurethane.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A medical product with a carrier layer, with one of the two surface-forming sides of the carrier layer forming the outside of the medical product, with a code permanently attached to the side forming the outside, characterized in that the code is a two-dimensional matrix code providing the uniform resource locator of an internet site, containing usage-specific and/or technical data relating to the medical product, with the two-dimensional matrix code being quick response code and the medical product a wound dressing.

2. The medical product according to claim 1, characterized in that the quick response code comprises as symbolic elements from 21 ×21 squares up to inclusively 75×75 squares, in particular 21×21 squares up to inclusively 53×53 squares, and in particular, 21×21 squares up to inclusively 45×45 squares.

3. The medical product according to claim 1, characterized in that the code has a minimum surface area of 0.5 cm$^2$ and a maximum of 20 cm$^2$, in particular a minimum of 1 cm$^2$, and a maximum of 15 cm$^2$, and particularly preferred, a minimum of 1 cm$^2$, and a maximum of 9 cm$^2$.

4. The medical product according to claim 1, characterized in that the usage-specific information is a content duplication of the package insert, the added note, or the usage directions, provided according to the medical product guidelines of this medical product.

5. The medical product according to claim 1, characterized in that the internet site provides the information or the data in the language of the country where the medical product was sold.

6. The medical product according to claim 1, characterized in that the carrier layer consists of woven fabric, interlaced fabric, knit fabric, nonwoven fabric, a film, or a combination thereof.

7. The medical product according to claim 1, characterized in that the code is applied directly to the carrier layer, in particular imprinted directly onto the carrier layer.

8. The medical product according to claim 1, characterized in that the code is covered with a transparent, and in particular non-reflective coating.

9. The medical product according to claim 1, characterized in that the medical product is a sterile medical product.

10. The medical product according to claim 1, characterized in that the code comprises a color changing color during a sterilization process, in particular with the color showing an absorption maximum within the wave length range between 400 nm and 800 nm following sterilization.

11. A set comprising at least one medical product according to claim 1, located in particular in a packaging, and a decoding device for decoding the code, and for establishing the connection with the internet site.

12. The set according to claim 11, characterized in that a mobile phone is used as decoding device, with the mobile phone being equipped with a device for taking pictures and decoding and transmitting software for the code.

13. A use of a quick response code for the encoding of a uniform resource locator of an internet site providing usage-specific information, and/or technical data for a medical product, with the medical product being a wound dressing.

14. A use according to claim 13, characterized in that the usage-specific information is a content duplication of the package information, the package insert or the usage directions pursuant to the medical product guideline of the medical product.

* * * * *